C. H. PATTEN.
SUSPENSION DEVICE FOR SHAFTS.
APPLICATION FILED JUNE 26, 1919.
1,329,848.
Patented Feb. 3, 1920.
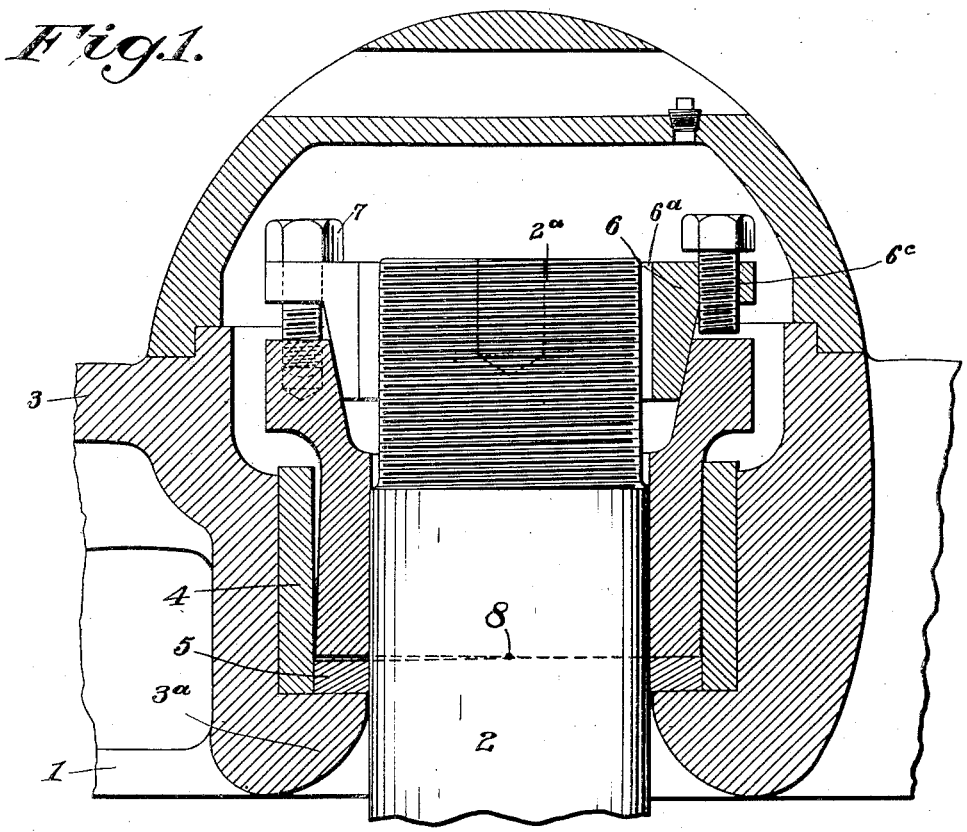
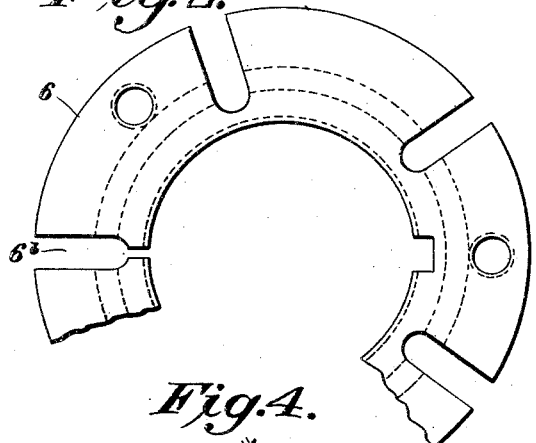
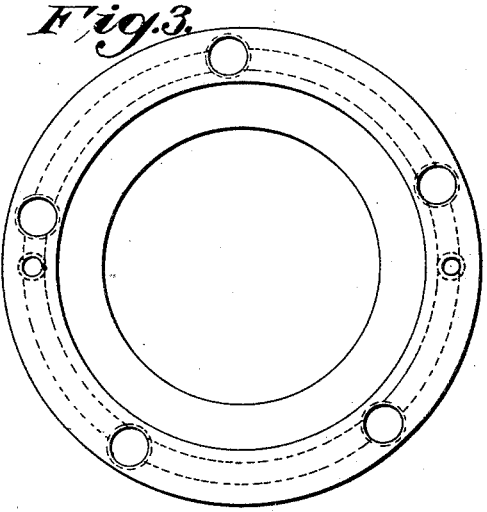
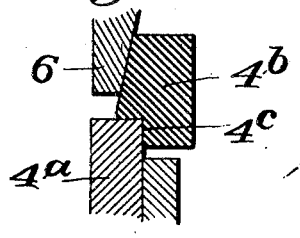
Inventor
Charles H. Patten
by Offield Middleton Donaldson & Hall
Atty's.

UNITED STATES PATENT OFFICE.

CHARLES H. PATTEN, OF ALLENTOWN, PENNSYLVANIA, ASSIGNOR TO TRAYLOR ENGINEERING & MFG. COMPANY, OF ALLENTOWN, PENNSYLVANIA, A CORPORATION OF DELAWARE.

SUSPENSION DEVICE FOR SHAFTS.

1,329,848.   Specification of Letters Patent.   Patented Feb. 3, 1920.

Application filed June 26, 1919. Serial No. 306,824.

*To all whom it may concern:*

Be it known that I, CHARLES H. PATTEN, a citizen of the United States, and resident of Allentown, Pennsylvania, have invented certain new and useful Improvements in Suspension Devices for Shafts, of which the following is a specification.

My present invention relates to improvements in shaft suspension devices and is designed more especially for suspending the shafts of gyratory crushers, though not limited to such use.

In such crushers the shafts are suspended from the upper ends and a great deal of trouble has heretofore been experienced with the stripping or wearing of the threads of the suspension nuts heretofore employed, and many attempts have been made to obviate these defects.

The invention aims to provide an extremely simple suspension means, which may be economically manufactured, and easily and quickly assembled and adjusted, and by which the assembled parts will be firmly held and prevented from relative creeping movement, thereby eliminating wear, and in which all danger of loosening of parts or stripping or wearing of threads during working of the apparatus will be eliminated.

With these and other objects in view the invention includes the novel features of construction and arrangement and combination of parts hereinafter described, my said invention being defined by the appended claims.

An embodiment of my invention is illustrated in the accompanying drawings, in which Figure 1 is a sectional elevation of the upper part of a crusher and shaft, and Figs. 2 and 3 are detail views.

Fig. 4 is a view of a modification.

Referring by reference characters to this drawing the numeral 1 designates the crusher frame, and 2 the crusher shaft, which parts may be of the ordinary, or any desired construction. The shaft is suspended from a cross bar or member 3, which is preferably of the form disclosed and claimed in an application filed by Lewis J. Hewes, on the 18th day of June, 1919, Serial Number 305,150.

This cross bar has a central portion or hub apertured to receive the upper end of the shaft, said aperture having at its lower end an inwardly extending annular flange or shoulder $3^a$.

Encircling the shaft is a bearing sleeve having a substantially frusto-conical or tapered outer surface held within the bushing 4 carried within the hub aperture, said sleeve resting at its lower end on a thrust washer 5 supported by the shoulder $3^a$. It will be understood that the shaft is inclined to the vertical, and the taper of the sleeve corresponds to the inclination of the shaft.

The upper portion of the sleeve is bored out to form a flaring recess between the upper portion of the sleeve and the upper end of the shaft, and a tapered split nut 6 is screwed upon the threaded end $2^a$ of the shaft, the outer conical wall of the nut bearing against the flaring wall of the recess. By this arrangement the weight of the shaft and parts carried thereby tends to draw the conical nut down into the flaring recess, contracting the nut upon the threaded shaft and causing the sleeve and shaft to be firmly locked together, and held during the working of the apparatus, as any jarring or vibration will only tend to work the parts more tightly together.

A feather $6^a$ is provided to hold the nut in proper position during assembly.

The nut is further provided on its exterior with vertical grooves or serrations $6^b$ which impart a certain amount of flexibility to the nut and enable it to hug or engage the threaded portion evenly through its entire circumference.

If it is desired to augment the clamping effect of the weight of the shaft bolts 7 may be added for forcing the tapered nut into the sleeve or bushing, which bolts may be passed through the serrations $6^b$.

In order to strip the parts the nut is provided at its upper end with screw-threaded openings $6^c$ in which set screws may be inserted to bear at their lower ends against the top of the sleeve for forcing the nut out of the sleeve.

If desired the part which has the flaring recess to receive the taper split nut may be made independent of the sleeve as shown in Fig. 4 in which the sleeve is shown at $4^a$ as of substantially cylindrical form and is surmounted by an independent member or part 4ᵇ having the internal taper to receive the split nut.

In this form I prefer to rabbet the lower end of the ring shaped member to fit the upper end of the sleeve as indicated at 4ᶜ.

What I claim is:—

1. In combination a suspension member having a bearing part, a vertical shaft having its upper end within said bearing, a ring shaped member encircling the shaft and having an inner flared wall, and a split tapered member carried by the upper end of the shaft and engaging said flared wall.

2. In combination a suspension member having a thrust bearing recess, a vertical shaft having its upper end within said recess, a thrust bearing sleeve encircling the shaft within the recess and having a flared upper end, and a split tapered nut threaded upon the shaft and resting in the flared upper end of the sleeve.

3. In combination a suspension member having a thrust bearing recess, a vertical shaft having its upper end within said recess, a thrust bearing sleeve encircling the shaft within the recess and having a flared upper end, and a split tapered nut threaded upon the shaft and resting in the flared upper end of the sleeve, and means for locking said nut in determined position.

4. In combination a suspension member having a thrust bearing recess with an internal annular shoulder, a thrust bearing sleeve supported by said shoulder and having a flared upper end, a shaft within said sleeve, and a split conical member carried by the shaft and engaging said flared upper end.

5. In combination a suspension member, a thrust bearing sleeve carried thereby having a flared portion, a shaft within said sleeve, a tapered split nut threaded on said shaft and engaging the flared portion of the sleeve, said nut having exterior longitudinal grooves.

6. In combination a suspension member having a thrust bearing recess, a thrust bearing sleeve carried thereby having a flared upper end, a vertical shaft within said sleeve, a tapered nut threaded on the shaft and engaging the flared portion of the sleeve, said nut having an annular flange overhanging the sleeve and provided with a threaded opening, and a set screw passed through said threaded opening and adapted to engage the sleeve to separate the parts.

7. In a suspension member, a thrust bearing sleeve carried thereby having a flared portion, a shaft within the bearing sleeve, a split nut on the shaft having a flange overlying the bearing sleeve, and bolts passing through the flange and engaging the sleeve.

8. A suspension device for a gyratory crusher shaft comprising a sleeve fitting the upper end of the shaft and a split nut tapered on outside to fit a flaring recess in top of said sleeve, the weight of the suspended members contracting the nut and causing it to lock the parts together.

9. A suspension device for a gyratory crusher shaft comprising a sleeve encircling the upper end of the crusher shaft, a ring shaped member resting on the top of said sleeve, and a split nut on the shaft having an outside taper coacting with the internal taper of the ring to contract the nut upon the shaft under the weight of the suspended parts.

In testimony whereof, I affix my signature.

CHAS. H. PATTEN.